US007764699B2

(12) United States Patent
Jennings et al.

(10) Patent No.: US 7,764,699 B2
(45) Date of Patent: Jul. 27, 2010

(54) METHOD AND SYSTEM USING SHARED CONFIGURATION INFORMATION TO MANAGE NETWORK ACCESS FOR NETWORK USERS

(75) Inventors: Cullen F. Jennings, Santa Cruz, CA (US); Cary W. FitzGerald, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 1170 days.

(21) Appl. No.: 11/130,439

(22) Filed: May 16, 2005

(65) Prior Publication Data

US 2006/0256731 A1 Nov. 16, 2006

(51) Int. Cl.
*H04L 12/56* (2006.01)
(52) U.S. Cl. .............................. 370/401; 726/4; 726/11
(58) Field of Classification Search ......... 370/400–402, 370/420–421; 385/186–188; 713/167–200; 709/227–229
See application file for complete search history.

(56) References Cited

U.S. PATENT DOCUMENTS

| 3,963,874 | A | 6/1976 | Pommerening et al. ....... 179/18 |
| 4,809,321 | A | 2/1989 | Morganstein et al. ....... 379/211 |
| 5,134,610 | A | 7/1992 | Shand et al. .................. 370/60 |
| 5,526,416 | A | 6/1996 | Dezonno et al. ............. 379/265 |
| 5,649,105 | A | 7/1997 | Aldred et al. .......... 395/200.04 |
| 5,724,420 | A | 3/1998 | Torgrim ...................... 379/372 |
| 5,742,905 | A | 4/1998 | Pepe et al. .................. 455/461 |
| 5,940,591 | A * | 8/1999 | Boyle et al. ...................... 726/3 |
| 5,991,645 | A | 11/1999 | Yuen et al. .................. 455/568 |
| 6,295,354 | B1 | 9/2001 | Dezonno .................... 379/266 |
| 6,301,339 | B1 | 10/2001 | Staples et al. |
| 6,353,886 | B1 | 3/2002 | Howard et al. .............. 713/156 |
| 6,463,471 | B1 | 10/2002 | Dreke et al. |
| 6,501,750 | B1 | 12/2002 | Shaffer et al. ............... 370/352 |
| 6,510,162 | B1 | 1/2003 | Fijolek et al. ............... 370/432 |
| 6,546,087 | B2 | 4/2003 | Shaffer et al. ........... 379/90.01 |
| 6,546,097 | B1 | 4/2003 | Peltz ..................... 379/265.07 |
| 6,567,505 | B1 | 5/2003 | Omori et al. .................. 379/84 |
| 6,697,462 | B2 | 2/2004 | Raymond |
| 6,751,463 | B1 | 6/2004 | Lorello et al. ............... 455/466 |
| 6,754,712 | B1 | 6/2004 | Valencia ..................... 709/227 |
| 6,757,722 | B2 | 6/2004 | Lonnfors et al. ........... 709/220 |

(Continued)

OTHER PUBLICATIONS

S. Blake et al., "An Architecture for Differentiated Services," RFC 2475, The Internet Society, 36 pages, 1998.

(Continued)

*Primary Examiner*—Thai D Hoang
(74) *Attorney, Agent, or Firm*—Baker Botts L.L.P.

(57) ABSTRACT

In accordance with a particular embodiment of the present invention, a method using shared configuration information to manage network access for externally generated communications includes maintaining association information for a first end user of a private network and maintaining configuration information for a first endpoint associated with the first end user. When an externally generated communication that is addressed for delivery to a second endpoint associated with a second end user is received at an access point to the private network, the association information is used to determine an association between the first end user and the second end user. The configuration information for the first end user is used to configure the access point to allow the communication to be delivered to the second endpoint.

28 Claims, 2 Drawing Sheets

U.S. PATENT DOCUMENTS

| | | | |
|---|---|---|---|
| 6,760,322 B1 | 7/2004 | Fukuda et al. | 370/352 |
| 6,766,165 B2 | 7/2004 | Sharma et al. | 455/423 |
| 6,785,266 B2 | 8/2004 | Swartz | 370/352 |
| 6,788,779 B2 | 9/2004 | Ostapchuck | 379/265.02 |
| 6,807,423 B1 | 10/2004 | Armstrong et al. | 455/440 |
| 6,853,634 B1 | 2/2005 | Davies et al. | 370/349 |
| 6,928,473 B1 | 8/2005 | Sundaram et al. | |
| 6,930,983 B2 | 8/2005 | Perkins et al. | 370/252 |
| 7,010,292 B2 | 3/2006 | Jerbi et al. | 455/414.1 |
| 7,039,713 B1 | 5/2006 | Van Gunter et al. | 709/229 |
| 7,042,988 B2 | 5/2006 | Juitt et al. | 379/88.17 |
| 7,043,643 B1 | 5/2006 | Doe et al. | 713/189 |
| 7,043,753 B2 | 5/2006 | Roddy et al. | 726/11 |
| 7,058,387 B2 | 6/2006 | Kumar et al. | |
| 7,062,563 B1* | 6/2006 | Lewis et al. | 709/227 |
| 7,149,801 B2 | 12/2006 | Burrows et al. | |
| 7,242,421 B2 | 7/2007 | Center, Jr. et al. | 348/14.1 |
| 7,260,632 B2* | 8/2007 | Shaffer et al. | 709/224 |
| 7,379,461 B2 | 5/2008 | Wu et al. | |
| 7,418,736 B2* | 8/2008 | Ghanea-Hercock | 726/28 |
| 2001/0042202 A1 | 11/2001 | Horvath et al. | |
| 2002/0019853 A1 | 2/2002 | Vange et al. | 709/207 |
| 2002/0024947 A1 | 2/2002 | Luzzatti et al. | |
| 2002/0112073 A1 | 8/2002 | McLampy et al. | |
| 2002/0150041 A1 | 10/2002 | Reinshmidt et al. | 370/216 |
| 2002/0172365 A1 | 11/2002 | Nakagomi et al. | |
| 2002/0181394 A1 | 12/2002 | Partain et al. | |
| 2003/0107991 A1 | 6/2003 | Tezuka et al. | 370/229 |
| 2003/0225549 A1 | 12/2003 | Shay et al. | |
| 2004/0034793 A1 | 2/2004 | Yuan | |
| 2004/0071084 A1 | 4/2004 | El-Hennawey et al. | 370/230 |
| 2004/0073634 A1* | 4/2004 | Haghpassand | 709/220 |
| 2004/0073690 A1 | 4/2004 | Hepworth et al. | |
| 2004/0249910 A1 | 12/2004 | Jerbi et al. | |
| 2005/0022180 A1 | 1/2005 | Couturier | 717/173 |
| 2005/0044405 A1* | 2/2005 | Spraggs | 713/200 |
| 2005/0066033 A1 | 3/2005 | Cheston | |
| 2005/0075842 A1* | 4/2005 | Ormazabal et al. | 702/188 |
| 2005/0083912 A1 | 4/2005 | Afshar et al. | |
| 2005/0086495 A1 | 4/2005 | Sheth et al. | 713/182 |
| 2005/0188194 A1 | 8/2005 | Fascenda | |
| 2005/0210148 A1 | 9/2005 | Kato et al. | |
| 2005/0228895 A1 | 10/2005 | Karunamurthy et al. | |
| 2005/0232184 A1 | 10/2005 | Borella | |
| 2005/0262195 A1 | 11/2005 | Ono et al. | 709/203 |
| 2005/0283837 A1 | 12/2005 | Olivier et al. | 726/24 |
| 2006/0041936 A1* | 2/2006 | Anderson et al. | 726/11 |
| 2006/0047782 A1 | 3/2006 | Niemi | 709/220 |
| 2006/0070003 A1 | 3/2006 | Thompson et al. | 715/758 |
| 2006/0095560 A1 | 5/2006 | Wu et al. | 709/224 |
| 2006/0130127 A1* | 6/2006 | Kaler et al. | 726/7 |
| 2006/0167991 A1 | 7/2006 | Heikes et al. | |
| 2006/0230279 A1* | 10/2006 | Morris | 713/182 |
| 2006/0253458 A1* | 11/2006 | Dixon et al. | 707/10 |
| 2006/0259958 A1* | 11/2006 | Jennings et al. | 726/6 |

OTHER PUBLICATIONS

E. Crawley et al., "RFC 2386-A Framework for QoS-based Routing in the Internet," RFC 2386, The Internet Society, 31 pages, 1998.

M Day et al., "A Model for Presence and Instant Messaging," RFC 2778, The Internet Society, 17 pages, 2000.

RealVNC, *About RealVNC*, RealVNC Ltd., 3 pages, 2002-2004.

Nortel Networks, *Eliminating Boundaries*, www.nortelnetworks.com, pp. 1-10, 2004.

www.webopedia.com, *firewell* definition, 2 pages, Aug. 26, 2004.

www.webopedia.com, *virtual network computing* definition, 2 pages, Jan. 21, 2005.

US 6,758,543, 06/2004, Vilhuber (withdrawn).

Patent Pending U.S. Appl. No. 11/089,743, entitled *Method and System Using Quality of Service Information for Influencing a User's Presence State*, by Cullen F. Jennings et al., pp. 1-34 plus 2 pages of drawings, filed Mar. 25, 2005.

Patent Pending U.S. Appl. No. 11/092,782, entitled *Method and System Indicating a Level of Security for VOIP Calls Through Presence*, by Cary W. Fitzgerald et al., pp. 1-37 plus 2 pages of drawings, filed Mar. 28, 2005.

Patent Pending U.S. Appl. No. 11/129,949, entitled Method and System Using Presence Information to Manage Network Access, by Cullen F. Jennings et al., pp. 1-28 plus 2 pages of drawings, filed May 16, 2005.

Patent Pending U.S. Appl. No. 11/129,970, entitled *Method and System to Protect the Privacy of Presence Information for Network Users*, by Cullen F. Jennings et al., pp. 1-35 plus 3 pages of drawings, filed May 16, 2005.

PCT Search Report for International Application No. PCT/US06/17331, 9 pages, Sep. 6, 2006.

Richardson et al., "Virtual Network Computing," IEEE Internet Computing, vol. 2, No. 1, title page plus pp. 33-38, Jan./Feb. 1998.

USPTO Office Action, for U.S. Appl. No. 11/089,743, Jennings, Sep. 23, 2008.

USPTO Office Action, for U.S. Appl. No. 11/129,949, Jennings, Nov. 21, 2008.

USPTO Office Action, for U.S. Appl. No. 11/092,782, Fitzgerald, Nov. 28, 2008.

*USPTO; Office Action* for U.S. Appl. No. 11/129,949, filed May 16, 2005 in the name of Cullen F. Jennings; 13 pages, Mar. 25, 2009.

*USPTO; Office Action* for U.S. Appl. No. 11/089,743, filed Mar. 25, 2005 in the name of Cullen F. Jennings; 15 pages, Apr. 15, 2009.

*USPTO; Office Action* for U.S. Appl. No. 11/092,782, filed Mar. 28, 2005 in the name Cary W. Fitzgerald; 12 pages, May 18, 2009.

*USPTO; Office Action* for U.S. Appl. No. 11/089,743, Cary W. Fitzgerald, Notification Date Jul. 23, 2009, 12 pages.

*USPTO; Office Action* for U.S. Appl. No. 11/129,949, Cullen F. Jennings, Notification Date Sep. 4, 2009, 14 pages.

*USPTO; Office Action* for U.S. Appl. No. 11/129,970, Cullen F. Jennings, Notification Date Sep. 16, 2009, 10 pages.

USPTO Office Action for U.S. Appl. No. 11/092,782, Cary W. Fitzgerald, 11 pages, Oct. 19, 2009.

USPTO Office Action, U.S. Appl. No. 11/089,743, inventor Fitzgerald, 10 pages, Jan. 21, 2010.

USPTO Office Action for U.S. Appl. No. 11/129,949, Cullen F. Jennings, 16 pages, Feb. 24, 2010.

State Intellectual Property Office of the People's Republic of China, The First Office Action, Filing No. 200680010477.1, 9 pages, Jan. 8, 2010.

* cited by examiner

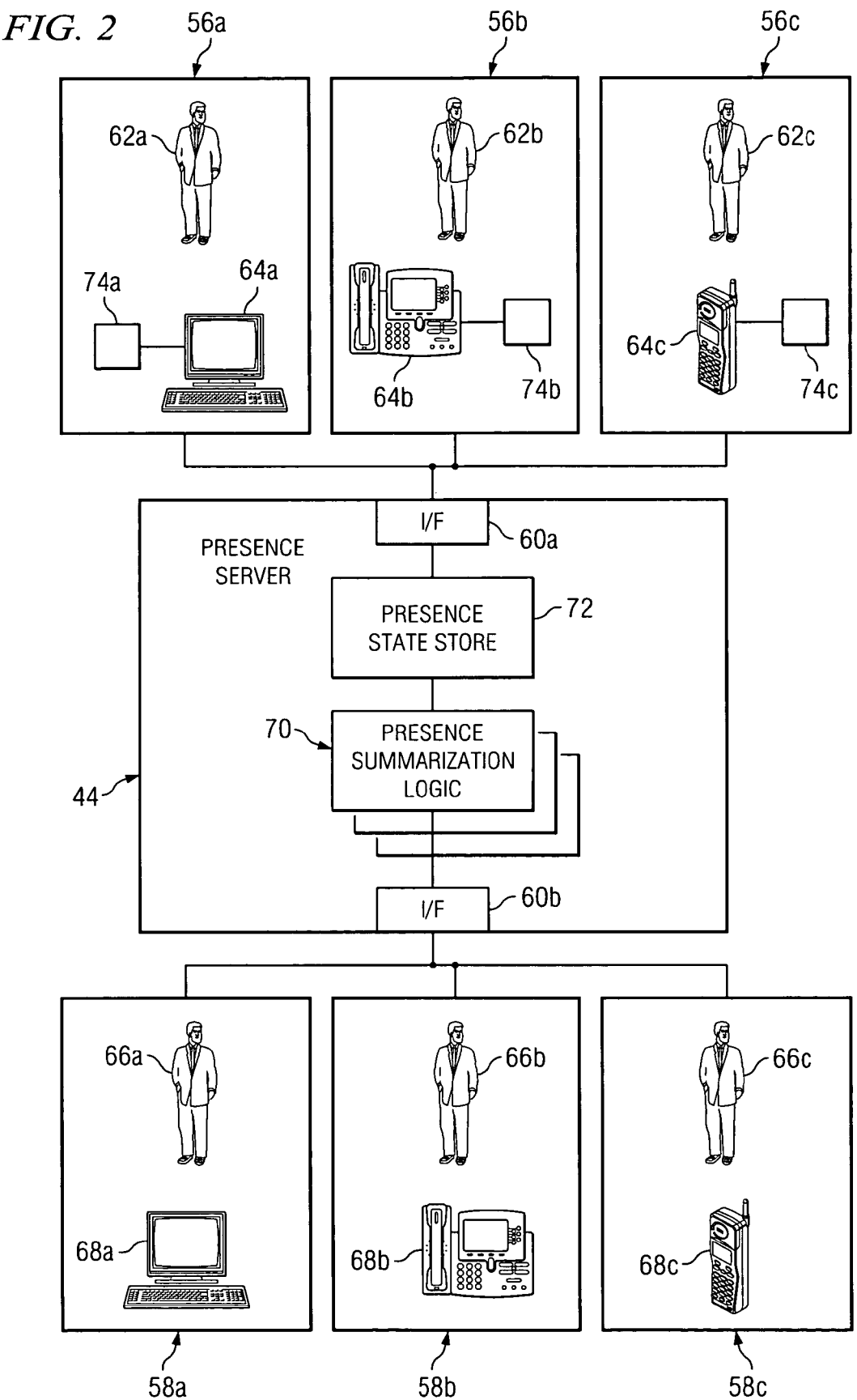

METHOD AND SYSTEM USING SHARED CONFIGURATION INFORMATION TO MANAGE NETWORK ACCESS FOR NETWORK USERS

RELATED APPLICATIONS

The present application is related to co-pending U.S. patent applications: Ser. No. 11/089,743, entitled Method and System Using Quality of Service Information for Influencing a User's Presence State, filed Mar. 25, 2005, Ser. No. 11/092,782, entitled Method and System Indicating a Level of Security for VoIP Calls Through Presence, filed Mar. 28, 2005, Ser. No. 11/129,949, entitled Method and System Using Presence Information to Manage Network Access, filed May 16, 2005, and Ser. No. 11/129,970, entitled Method and System to Protect the Privacy of Presence Information for Network Users, filed May 16, 2005, the disclosures of which are hereby incorporated by reference, as if fully set forth herein.

TECHNICAL FIELD OF THE INVENTION

This invention relates in general to communication systems and, more particularly, to a method and system using shared configuration information to manage network access for network users.

BACKGROUND OF THE INVENTION

A private network system generally includes a number of network devices, such as switches and routers, connected so as to allow communication among the devices and end station devices such as desktop machines, servers, hosts, printers, fax machines, and others. To receive communications initiating external to the private network, the devices may be individually configured such that a firewall or other access point includes pinholes through which externally generated traffic is allowed to pass. Current communication platforms (such as session initiation protocol (SIP), for example) do not allow such configurations to be automatically or systematically shared between network users. This deficiency presents an obstacle for any employee, employer, individual, or endpoint that seeks to execute successful, productive, and secure communication sessions.

SUMMARY OF THE INVENTION

The present invention provides a method and system using shared presence information to manage network access for externally generated communications that substantially eliminates or reduces at least some of the disadvantages and problems associated with previous methods and systems.

In accordance with a particular embodiment of the present invention, a method using shared configuration information to manage network access for externally generated communications includes maintaining association information for a first end user of a private network and maintaining configuration information for a first endpoint associated with the first end user. When an externally generated communication that is addressed for delivery to a second endpoint associated with a second end user is received at an access point to the private network, the association information is used to determine an association between the first end user and the second end user. The configuration information for the first end user is used to configure the access point to allow the communication to be delivered to the second endpoint.

In accordance with another embodiment of the present invention, a method using shared configuration information to manage network access for externally generated communications includes maintaining association information for a first end user of a private network and maintaining configuration information for a first endpoint associated with the first end user. When an externally generated communication that is addressed for delivery to a second endpoint associated with a second end user is received at an access point to the private network, the association information is used to determine an association between the first end user and the second end user and to identify the first end user as untrustworthy. The access point is then configured to disallow the communication to be delivered to the second endpoint.

Certain embodiments of the present invention may provide a number of technical advantages. For example, according to one embodiment of the present invention, an architecture and a process are provided that allows for the centralized storage and management of access point configurations for a plurality of network endpoints and their associated users. In particular embodiments, the configuration information may include firewall pinhole definitions for a network end user. A further technical advantage may be the sharing of the network access configurations between endpoints and end users. Specifically, presence or association policy may be used to determine whether or not to apply the pinhole configurations adopted by one network end user to other network end users. Where policy permits, communications deemed acceptable by one network end user may be automatically granted access to a private network even where those communications are addressed to other network end users.

Other technical advantages will be readily apparent to one skilled in the art from the following figures, descriptions and claims. Moreover, while specific advantages have been enumerated above, various embodiments may include all, some or none of the enumerated advantages.

BRIEF DESCRIPTION OF THE DRAWINGS

For a more complete understanding of the present invention and its advantages, reference is now made to the following description, taken in conjunction with the accompanying drawings, in which:

FIG. 2 illustrates the association information store of FIG. 1 in more detail, illustrating aspects of the present invention.

DETAILED DESCRIPTION OF THE INVENTION

Figure 1:
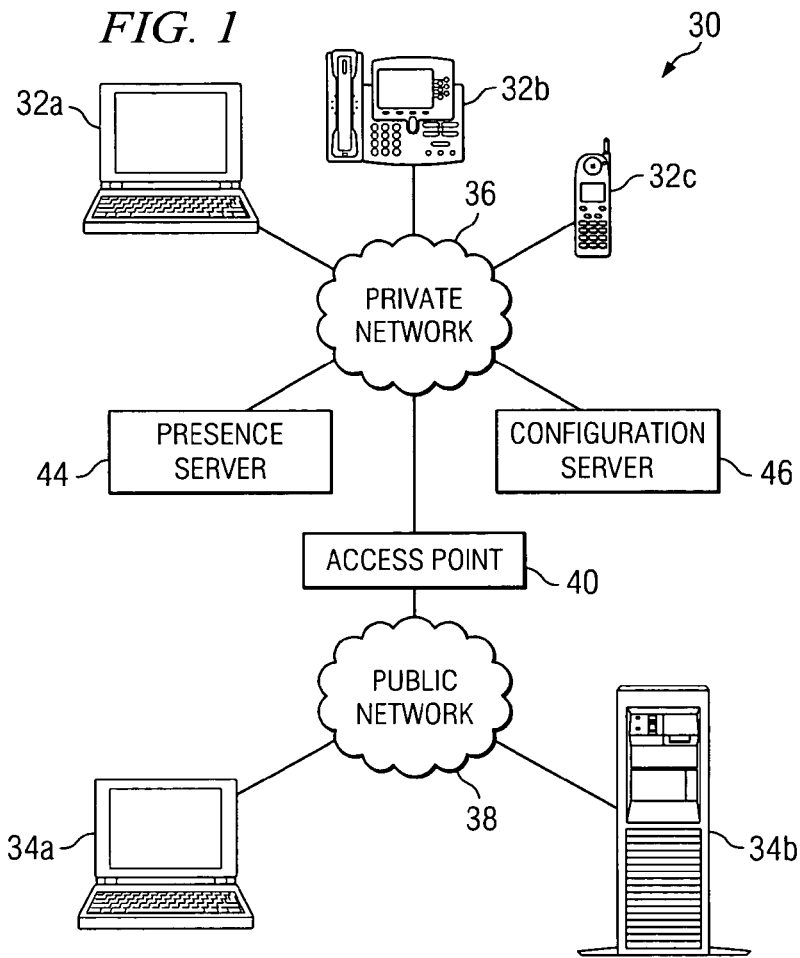
FIG. 1 illustrates a network system that uses shared configuration information to manage network access for externally generated communications in accordance with a particular embodiment of the present invention.

FIG. 1 illustrates a network system 30 that uses shared configuration information for the automatic configuration of network access points in accordance with a particular embodiment of the present invention. Network system 30 includes a plurality of network endpoints 32a-32c having the ability to communicate with one another and with other network devices using a private network 36. One or more remote endpoints 34a-34b may communicate with network endpoints 32a-32c and other network devices using a combination of private network 36 and a public network 38. Communications and other data from remote endpoints 34*a*-34*b* enter private network 36 through an access point 40, such as a firewall. To enable a network endpoint 32 to receive such communications and data, access point 40 applies access configurations and settings that are established for the network endpoint 32 by an associated end user.

In particular embodiments, the access configurations and settings may define one or more pinholes in access point 40 that are particular to the specific network endpoint 32. The pinholes may define criteria that, if satisfied by an incoming communication or other data, result in the communication or data being automatically accepted by access point 40. Thus, incoming communications and other data that are addressed to a network endpoint 32 are examined at access point 40 to determine if the communications or data satisfy the pinhole criteria before the communications or data are forwarded to the addressed network endpoint 32. If the criteria is not met the communications or data are not allowed into private network 36. The management and sharing of presence or other association information by components of network system 30, however, allows the pinhole configurations accepted by one network endpoint 32 to be automatically applied to other network endpoints 32. Accordingly, communications and data deemed acceptable by one network endpoint 32 may be automatically granted access to private network 36 even where those communications and data are addressed to another network endpoint 32.

As described above, network system 30 includes private network 36. "Private network" should be interpreted, however, as generally defining any network capable of transmitting audio and/or video telecommunication signals, data, and/or messages, including signals, data or messages transmitted through text chat, instant messaging and e-mail. Accordingly, private network 36 may be implemented as a local area network (LAN), wide area network (WAN), global distributed network such as the Internet, Intranet, Extranet, or any other form of wireless or wireline network.

Generally, private network 36 provides for the communication of packets, cells, frames, or other portions of information (generally referred to as packets herein) between network endpoints 32*a*-32*c* and other network devices. It is generally recognized that private network 36 may include any combination of network components, gatekeepers, telephony servers, routers, hubs, switches, gateways, endpoints, or other hardware, software, or embedded logic implementing any number of communication protocols that allow for the exchange of packets in network system 30. In particular embodiments, private network 36 may include a local area network (LAN) that enables network endpoints 32*a*-32*c* distributed across multiple cities and geographic regions to establish data sessions between and among the network components coupled to private network 36.

As will be described in more detail below, communications generated from sources external to private network 36 may gain access to private network 36 through public network 38. Public network 38 may comprise any computer network such as the Internet, an extranet, or other known or hereinafter developed network for the communication of data. As technical background, the Internet is a world wide network of networks that links many computers through many separate, but inter-communicating, networks. Using the Internet, network users can access vast amounts of stored information and establish communication with Internet capable remote endpoints 34*a*-34*b*.

It will be recognized by those of ordinary skill in the art that network endpoints 32*a*-32*c*, remote endpoints 34*a*-34*b*, and/or access point 40 may be any combination of hardware, software, and/or encoded logic that provides data communication services to end users of private network 36. For example, each network endpoint 32*a*-32*c* and remote endpoint 34*a*-34*b* may include a computing device, such as a desktop personal computer, an IP phone, a cell phone or any other communication hardware, software, and/or encoded logic that supports the communication of data packets of media (or frames) using private network 36 and public network 38. Network endpoints 32*a*-32*c* and remote endpoints 34*a*-34*b* may also include unattended or automated systems, servers, gateways, other intermediate components, or other devices that can establish data sessions. Although FIG. 1 illustrates a particular number and configuration of network endpoints 32*a*-32*c*, remote endpoints 34*a*-34*b*, and access points 40, network system 30 contemplates any number or arrangement of such components for communicating data. Furthermore, network endpoints 32*a*-*c* and 34*a*-*b* of system 30 may be associated with any number of end users.

In particular embodiments, private network 36 employs communication protocols that allow for the addressing or identification of network endpoints 32*a*-32*c* and other network devices of private network 36. For example, using Internet protocol (IP), each of the components coupled together by private network 36 in network system 30 may be identified using IP addresses. Technology that allows telecommunications to be transmitted over an IP network may comprise Voice over IP (VoIP), or simply Voice over Packet (VoP). The transmission of data using this technology may include placing the data in packets and sending each packet individually to the selected destination, along one or more communication paths. In this manner, private network 36 may support any form and/or combination of point-to-point, multicast, unicast, or other techniques for exchanging media packets among components in network system 30. Any network components capable of exchanging audio, video, or other data using frames or packets, are included within the scope of the present invention.

In particular embodiments, network system 30 may receive and transmit data in a session initiation protocol (SIP) environment. SIP is an application-layer control protocol that includes primitives for establishing, modifying, and terminating communication sessions. SIP works independently of underlying transport protocols and without dependency on the type of session that is being established. SIP also transparently supports name mapping and redirection services, which support personal mobility.

In particular embodiments, and as will be described in more detail below, association information store 44 may include a presence server. Within network system 30, the presence information maintained by association information store 44 may be used to detect the presence of end users at network devices 32*a*-32*c*. For example, users of endpoints 32*a*-32*d* may be identified by components of system 30 according to a uniform reference identifier (URI), such as a user's email address, or other suitable identifier so that a user may be located, monitored, and/or contacted through presence detection technology. Presence detection technology employed by association information store 44 allows end users to maintain a single externally visible identifier regardless of their network location. For locating prospective session participants, and for other functions, an infrastructure of network hosts, such as association information store 44, may be created to which users of network endpoints 32*a*-32*c* can send registrations, invitations to sessions, and other requests.

For example, association information store 44 may enable network endpoints 32*a*-32*c* to discover one another for purposes of determining the availability of network users with respect to associated network endpoints 32a-32c. Thus, components of network system 30 may capture information about various communication devices, or endpoints, available to a user and their status, such as whether a cellular phone is switched on or whether a network user is logged into a personal computer (PC) by accessing information maintained by association information store 44. By querying association information store 44, a network endpoint 32 may obtain a presence availability status for network users, as well as location information, device information, and any personal presence status that a network user wishes to communicate to other network users. Hence, communication system 30 may provide enhanced information about network users and network endpoints 32a-32c. Although this may be achieved using a VoIP platform, the versatility of presence detection technology, enables it to be used in both IP components, such as IP phone 32b, and other non-IP components.

In particular embodiments, the presence or other association information maintained by association information store 44 may be used in combination with a configuration server 46 to apply configuration information associated with network endpoints 32a-32c to access point 40. In particular embodiments, configuration server 46 includes any combination of hardware (microprocessors, controllers, data storage systems, or other suitable computing devices or resources), software, and/or encoded logic that may be used to store configuration information associated with network endpoints 32a-32c for application to access point 40. The configuration information may identify one or more pinholes or other network access configurations that are applied by access point 40 when communications or other data are received from sources that are external to private network 36 (i.e., remote endpoints 34a-34b).

For the application of such configurations, access point 40 may include hardware and/or software designed to prevent unauthorized access to private network 36. For example, access point 40 may include a firewall that operates to receive externally generated communications or data directed at components of private network 36 and examine such communications and data to determine whether those communications and data meet specified security criteria. The security criteria, which may include the source IP address, the source IP port, the protocol, the destination IP address, the destination IP port, and/or other suitable criteria, may be used to identify whether a network endpoint 32 is configured to receive such communications and data through access point 40. Where the specified security criteria are met, the externally generated communications and data may be allowed through access point 40.

Where configuration server 46 stores and maintains configuration information for network endpoints 32a-32c and other network devices, configuration information may be shared between network endpoints 32a-32c and other network devices based on presence or other association policies. For example, the pinhole configurations adopted by a first network endpoint 32a may be automatically applied to a second network endpoint 32b if a policy exists that allows presence or association information to be shared between first network endpoint 32a and second network endpoint 32b. When an externally generated communication is received at access point 40 and is identified for delivery to network endpoint 32b, access point 40 may request configuration information from configuration server 46. To provide configuration information to access point 40, configuration server 46 may check the communication against configuration information associated with second network endpoint 32b. Additionally, configuration server 46 may access or be provided with policy information stored in presence server 44 to identify the applicability of configuration information associated with other network endpoints 32a, 32c to second network endpoint 32b. For example, configuration server 46 may receive information from or access information in association information store 44 that identifies or enables configuration server 46 to identify second network endpoint 32b as a subscriber of presence information for first network endpoint 32a. Where such a determination is made, configuration server 46 may additionally or alternatively check the communication against configuration information associated with first network endpoint 32a to determine whether to allow the communication to enter into private network 36. Thus, in addition to checking the communication against configuration information associated with network endpoint 32b, access point 40 may check the communication against configuration information associated with network endpoint 32a and/or other network devices for which second network endpoint 32b is entitled to receive presence information.

It will be recognized by those of ordinary skill in the art that network system 30 is merely one example configuration of a communications network using association information to maintain and apply network access configurations. Accordingly, it is generally recognized that network system 30 may include any number of servers, memory modules, access points, endpoints, or other components to accomplish the functionality and features described herein. Additionally, it is recognized that the functionality described as relating to the individual components of network system 30 may be implemented by any component of network system 30. For example, it is generally recognized that configuration information for the network endpoints may be stored in configuration server 46, association information store 44, access point 40, or any other component of network system 30.

FIG. 2 illustrates association information store 44 in more detail, in accordance with a particular embodiment of the present invention. Specifically, in the illustrated embodiment, association information store 44 comprises a presence server that is coupled to one or more presentities 56 and one or more presence watchers 58 through private network 36. Interfaces 60 allow presence server 44 to obtain information from presentities 56 and provide information to presence watchers 58. Examples of presence servers include presence servers as defined by Internet Engineering Task Force in Request for Comments 2778.

As will be described in more detail below, presentities 56a-56c include endpoints 64a-64d (and their associated end users 62a-62c) who provide presence information to presence server 44 for distribution to or access by presence watchers 58a-58c. Conversely, presence watchers 58a-58c include endpoints 68a-68c (and their associated end users 66a-66c) that receive presence information relating to presentities 56a-56c. Although presentities 56 and presence watchers 58 are illustrated as being exclusive from one another, it is generally recognized that an end user and its associated endpoints may both provide information to and receive information from presence server 44. Accordingly, any end user of presence server 44 may be both a presentity and a presence watcher.

Processor 70, which is illustrated in FIG. 2 as presence summarization logic 70, may include any combination of hardware (microprocessors, controllers, or other suitable computing devices or resources), software, and/or encoded logic that may be used to monitor the presence of a presentity with respect to private network 36. In particular embodiments, processor 70 comprises a single computer or a group of computers that are capable of detecting the presence of end users 62a-c with respect to endpoints 64a-64c. To detect the presence of end users 62a-62c with respect to endpoints 64a-64c, processor 70 may receive information from one or more of presence clients 74a-74c at the end user's endpoint 64a-64c. Thus, processor 70 may receive presence information from an end user's PC, phone, personal digital assistant (PDA) or any other presence client device (e.g., presence clients 74a-72c).

In particular embodiments, presence clients 74 include software or hardware embodied in a telecommunications switch that determines the hook status of a telephone or other device. In other embodiments, presence clients 74 include software that monitors whether an endpoint comprising a computer is logged into. In still other embodiments, presence clients 74 comprise a device that communicates with an ID tag worn by an end user 62 to indicate the location of end user 62. Although particular presence clients 74 are described, a variety of presence clients 74 may be utilized according to the teachings of the invention to provide presence information regarding the availability, location, or activity in which an end user 62 is engaged.

In particular embodiments, the presence information obtained about an end user 62 includes the "state" of that end user 62. For example, end users 62 may be placed in various states, such as a "ready" state, a "not ready" state, and a "talking" state, according to the current status of the endpoint 64 with respect to presence server 44. For example, an end user 62 in a ready state may be ready and able to accept an incoming communication. Accordingly, such an end user 62 may be said to be "available." Conversely, an end user 62 in a not ready state may be away from his desk or otherwise not ready to accept an incoming communication, and an end user 62 in a talking state may be currently participating in an incoming or outgoing communication. In either of these latter cases, the end user 62 may be said to be "unavailable." Other presence states that may be recognized may include "present", "not present", "active", "inactive", or any other state identifying the availability of an end user 62.

The presence information gathered by processor 70 may be stored in a memory module 72, which is illustrated in FIG. 2 as a present state store 72. Memory module 72 may include any form of volatile or non-volatile memory including, without limitation, magnetic media, optical media, random access memory (RAM), read-only memory (ROM), removable media, or any other suitable local or remote memory component.

As described above, the presence information stored in memory module 72 may be provided to or otherwise accessed by configuration server 46, which stores configuration information associated with network endpoints. For example, in operation, a first end user 62a may establish one or more network access configurations for a first endpoint 64a. The network access configurations may be stored in configuration server 46 and associated with presentity 56a. The stored network access configurations may then be used by access point 40 to process communications and data, which are identified for delivery to first endpoint 64a and are received from remote endpoints 34a-34b that are external to private network 36.

The centralized maintenance of presence information by presence server 44 may allow for the sharing of configuration information network end users. For example, the network access configurations associated with first endpoint 64a (and, thus, presentity 56a) may also be used by access point 40 to process communications and data that are identified for delivery to other network endpoints or presentities. Assume, for example, that a communication is received at access point 40 that is addressed to a second endpoint 68a. As described above, configuration server 46 may be queried to determine if second endpoint 68a is configured to receive the communication through access point 40. If second endpoint 68a is not configured to receive the communication through access point 40, configuration information associated with other endpoints may be applied to second endpoint 68. If the configuration information associated with first endpoint 64a identifies a pinhole for the communication, access point 40 may allow the communication to pass into private network 36 for delivery to second endpoint 68a. On the other hand, if the configuration information associated with first endpoint 64a does not identify a pinhole for the communication, access point 40 may prevent the communication from entering private network 36 for delivery to second endpoint 68a.

In particular embodiments, the configuration information stored in configuration server 46 may be freely distributed between network end users. Accordingly, access point 40 may apply configuration information associated with any network endpoint to all communications received at access point 40 regardless of the destination address of the communication. For example, if access point 40 receives a communication that is addressed to second endpoint 68a, access point 40 may query configuration server 46 for all stored configuration information. Depending upon the embodiment implemented, access point 40 may allow the communication to enter private network 36 if any network endpoint is configured to open a pinhole in access point 40 for the communication. Alternatively, access point 40 may allow the communication to enter private network 36 if a consensus of network endpoints are configured to open a pinhole in access point 40 for the communication. Thus, in some embodiments, network endpoints may "vote" to allow or refuse entry of the communication into private 36. Where the majority or some accepted and predefined portion of network endpoints are configured to allow the communication, network access point 40 may open the pinhole and allow the communication to be delivered to the destination address.

In other embodiments, the configuration information maintained by configuration server 46 may be applied to network endpoints on a subscription or registration basis. Accordingly, memory module 72 or another network device may include a list for some or all of end users 62a-c and 66a-66c. The lists may include subscription lists, buddy lists, or other association information. For example, rather than make configuration information for every network end user within system 30 available to every other network end user, network end users may be required to subscribe to a presence service. In an embodiment, network end users may be required to subscribe to the presence service to become a presentity 56. For example, first end user 62a may register with or subscribe to presence server 44 to become a presentity 56a. As a result of the registration or subscription, presence information about first end user 62a and associated endpoints, such as first endpoint 64a, may be provided to and maintained by presence server 44.

To make the first end user's presence information available to other end users, first end user 62a may identify end users who should be given access to first end user's presence information. Thus, first end user 62a may identify what network end users are authorized to be presence watchers 58 of first end user's presence information. Stated differently, first end user 62a may define a "Web of Trust" that will be associated with first end user 62a. Furthermore, first end user 62a may identify on an individual basis the extent to which such presence and, thus, configuration information should be available to presence watchers 58 in the first end user's Web of Trust. Because first end user 62a may allow some presence watchers 58 access to more or different presence and configuration information than other presence watchers 58, first end user 62a may exert an amount of control over the distribution of the first end user's endpoint configurations within the Web of Trust.

Additionally or alternatively, network end users may be required to register with or subscribe to the presence service to become presence watchers 58. For example, second end user 66a may be required to register with presence server 44 to become a presence watcher of first end user 62a. As a result of the registration or subscription, first end user 62a may be added to the subscription list, buddy list, or other association information maintained by memory module 72 for second end user 66a. Similarly, second end user 66a may be added to the subscription list, buddy list, or other association information maintained by memory module 72 for first end user 62a. Presence and configuration information associated with first end user 62a and associated endpoints, such as first endpoint 64a, may then be provided to or made available to second end user 66a.

Where presence watchers 58, such as second end user 66a, are required to subscribe or register to receive or access presence and configuration information, second end user 66a may define the members of the "Web of Trust" that will be associated with second end user 62a. Thus, second end user 62a may also exert an amount of control over the distribution of endpoint configurations applied to second endpoint 68a, in particular embodiments.

Regardless of whether the presentity, the presence watcher, or both are required to register with presence server 44, configurations associated with endpoints of network system 30 may be distributed to network users using any one of or any combination of methods. For example, in particular embodiments, configuration information may simply be stored in configuration server 46 and presence watchers 58 entitled to such configuration information may take affirmative steps to apply those configurations to their respective endpoints. Thus, second end user 66a, as a presence watcher of first end user 62a, may be required to access configuration server 46 and download the configurations associated with first endpoint 64a before those configurations may be applied to communications received by access point 40. In other embodiments, the configuration information may be periodically published or otherwise delivered to end user 66a if either of first end user 62a or second user 66a are within the other's Web of Trust. In still other embodiments, and as described in more detail above, access point 40, rather than second end user 66a, may directly obtain the shared configuration information when a communication is received at access point 40 for delivery to second end user 66a.

Although subscription lists and buddy lists are described above for associating users of network system 30 with other users of network system 30, it is recognized that any other mechanism for the linkage or association of users may be utilized. Other example sources of association information that may be used to provide presence information include address lists or contact lists from an email program (i.e., MicroSoft contacts), information provided by social networks or reputation services, or association lists such as those used by Five Degrees of Separation, Linked In, and Orchid. It is also recognized that the such mechanisms need not be stored in memory module 72 but may be stored in any component of network system 30. In particular embodiments, such mechanisms may be stored within configuration server 46 or at the endpoints.

Furthermore, it will be recognized by those of ordinary skill in the art that presence server 44 is merely one example configuration of a presence server for providing presence information to end users in network system 30. Accordingly, it is generally recognized that presence server 44 may include any number of processors, memory modules, or other components to accomplish the functionality and features described herein. Additionally, processor 70, and/or memory module 72 associated with presence server 44 may be centrally located (local) with respect to one another, or distributed throughout private network 36.

Returning to FIG. 1, it is generally recognized that presence information and the provision of a presence service using a presence server is merely one means that may be used to provide for the shared configuration of endpoints 32a-32c. Thus, although presence information is one form of association information that may be used to link endpoints 32a-32c, it is further recognized that the configuration of endpoints 32a-32c may be made using association information that is maintained and used independently of or in lieu of presence information.

For example, association information, generally, may be stored in association information store 44 or another network device and may be used to link end users of endpoints 32a-32c. Similar to the presence information disclosed above, the association information may define a web of trust associated with an end user of an endpoint 32a-32c, in particular embodiments. The web of trust may operate as a white list that is associated with an end user of a particular endpoint, such as endpoint 32a. Accordingly, the white list may define those other end users whose judgment the end user of endpoint 32a trusts. Specifically, if Bob is the end user of endpoint 32a and the white list associated with Bob includes Carl, the end user associated with endpoint 32b, and Don, the end user of endpoint 32c, Bob has identified that Bob trusts Carl and Don for various purposes. In operation, access point 40 may access configuration information associated with Bob when access point 40 receives an externally generated communication that is identified for delivery to Bob. If the configuration information associated with Bob does not identify a pinhole for the externally generated communication, access server 46 may look to Bob's white list to determine the end users included in Bob's web of trust. Where Carl and Don are on Bob's white list, access point 40 may then access configuration information that is associated with Carl and Don to determine if either or both of Carl and Don have configured their endpoints 32b and 32c to accept the communication. If either or both of Carl and Don have configured their endpoints 32b and 32c to accept the communication, access point 40 may allow the communication to pass into private network 36 for delivery to Don at endpoint 32a.

In the above described example, configuration information stored by configuration server 46 and associated with any end user within Bob's web of trust is used to configure access point 40 with respect to communications addressed to Bob's endpoint 32a. In other embodiments, however, access point 40 may recognize a conflict where one end user in Bob's web of trust includes a configuration allowing the communication and another end user in Bob's web of trust does not include such a configuration. For example, if one of Carl and Don have configured their endpoint 32b or 32c, respectively, to allow the communication into private network 36 and the other has not, access point 40 may recognize a conflict. Accordingly, access point 40 may include hardware, software, or logic that enables access point 40 to resolve the conflict. In one example embodiment, access point 40 may resolve the conflict by taking a vote of the end users in Bob's web of trust to determine whether a majority or another predefined percentage of end users in Bob's web of trust are configured to receive the communication. Access point 40 may then allow the communication to pass into private network 36 if enough end users in Bob's web of trust are configured to receive the communication.

In another example embodiment, access point 40 may resolve the conflict using an algebraic scheme that takes into account factors appropriate for determining the trustworthiness of the communication or the trustworthiness of the end users in the web of trust. For example, in particular embodiments, the Bob's association information in association information store 44 may include weighted values that are applied to the end users in Bob's web of trust. Thus, the association information associated with Bob may comprise a "grey list" rather than a white list. For example, the association information associated with Bob may include the following information:

| Carl | 100 |
|---|---|
| Don | 90 |
| Eunice | 20 |
| Frank | 50 |
| Gary | 88 |

Thus, Carl, Don Eunice, Frank, and Gary are within Bob's web of trust. However, in this example, Bob has identified the degree to which Bob believes that Carl, Don, Eunice, Frank, and Gary are trustworthy. Thus, Bob trusts Carl 100 percent of the time but only trusts Eunice 20 percent of the time. (Although percentages are shown, any other weighted or ranking scheme may be used.) In operation, access point 40 may use the weighted percentages and an algebraic formula to resolve any conflicts between the configuration information stored with respect to Carl, Don, Eunice, Frank, and Gary. Accordingly, in determining whether a communication should be allowed for delivery to Bob, access point 40 may consider the degree to which Bob considers the end users in Bob's web of trust as trustworthy.

In still other embodiments, the association information associated with Bob may additionally or alternatively comprise a "black list." Accordingly, the association information may define those other end users whose judgment Bob does not trust (i.e., those end users outside of the web of trust). For example, Bob's stored association information may include the following:

| Black List | White List |
|---|---|
| Don | Carl |
| Eunice | Gary |
| Frank | |

Thus, Bob has identified that Bob does not trust Don, Eunice, and Frank for various purposes but does trust Carl and Gary. In one example embodiment, when access point 40 receives an externally generated communication that is identified for delivery to Bob, access point 40 look to Bob's association information to determine the end users that are on Bob's white list. In the above described scenario, access point 40 may access configuration information that is associated with Carl and Gary to determine if either or both of Carl and Gary have configured their endpoints to accept the communication and may allow the communication if either or both of Carl and Gary have configured their endpoints to accept the communication. If neither of Carl and Gary have configured their endpoints to accept the communication or if their is a conflict between the configurations associated with Carl and Gary, access point 40 may access configuration information associated with Don, Eunice, and/or Frank. Because Bob doesn't trust the configuration information associated with Don, Eunice, and/or Frank, access point 40 may refuse to allow the communication to pass into private network 36 where any, all, or some percentage of the end users on Bob's black list are configured to allow the communication. Thus, the untrustworthiness of some network end users may be considered in determining whether to allow an externally generated communication to enter private network 36.

Although the above described examples are limited to the application of configuration information associated with those end users with whom Bob is directly associated, it is recognized that the Bob's web of trust may be broader than those end users with whom he is directly associated. In particular embodiments, association information for various end users may be linked to define sets of end users with whom configuration information may be shared. For example, configuration server 46 may store the following association information:

| BOB | Carl |
|---|---|
| Carl | Don |
| Eunice | Gary |
| Frank | |

Thus, Bob has identified that Bob trusts Carl, Eunice, and Frank for various purposes, and Carl has identified that Carl trusts Don and Gary for various purposes. In one example embodiment, when access point 40 receives an externally generated communication that is identified for delivery to Bob and Bob's endpoint is not configured to receive the communication, access point 40 may look to Bob's association information to determine the end users that are on Bob's white list. In the above described scenario, access point 40 may access configuration information that is associated with Carl, Eunice, and Frank to determine if any or all of Carl, Eunice, and Frank have configured their endpoints to accept the communication. Because Bob trusts Carl, Eunice, and Frank, however, access point 40 may also access the white lists of Carl, Eunice, and Frank to identify end users who they trust. In the above described scenario, for example, access point 40 may access Carl's white list to identify that Carl trusts Don and Gary. Access point 40 may then access configuration information that is associated with Don and Gary to determine if either or both of Don and Gary have configured their endpoints to accept the communication. If either or both of Don and Gary have configured their endpoints to accept the communication or if some percentage of all end users considered are configured to accept the communication, access point 40 may allow the communication to pass into private network 36 for delivery to Bob.

It will be recognized by those of ordinary skill in the art that the scenarios described above are merely provided as examples. End users of private network 36 may be linked or associated with one another using any appropriate mechanism. Additionally, the association information stored with respect to an end user may be shared with other end users in any of the above described manners or by any other suitable manner.

Figure 3:
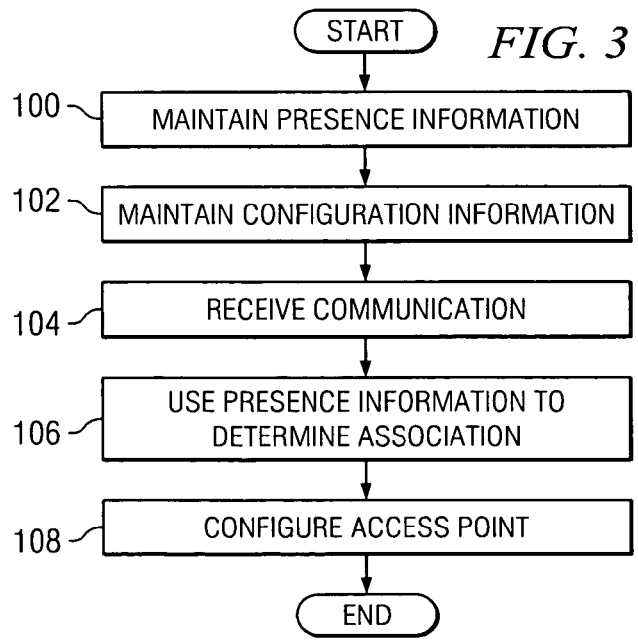
FIG. 3 illustrates an example method that uses shared configuration information to manage network access for externally generated communications, in accordance with an embodiment of the present invention.

FIG. 3 illustrates an example method that uses shared association information to manage network access for externally generated communications. The method begins at step 100 with the maintenance of association information. As described above, in particular embodiments, the association information may include presence information relating to the availability or activity information for a plurality of network end users, including first end user 62a. For example, the presence information may include a list of one or more presence watchers that are authorized to access presence information for first end user 62a.

At step 102, configuration information for the plurality of network end users, including first end user 62a, is maintained. In particular embodiments, the configuration information may include access point configurations for first endpoint 64a, which is associated with first network end user 62a. The access point configurations may be applied by access point 40 to authorize communications generated at remote endpoints 34a-34b that are external to private network 36 for delivery within communication network 30. For example, the configuration information maintained in configuration server 46 may identify one or more pinholes or other network access configurations to be applied by access point 40 when externally generated communications or other data are received for delivery to network endpoints.

At step 104, an externally generated communication is received at access point 40 to private network 36. As described above, the externally generated communication may include any communication or data that is received from endpoints that are remote to private network 36. In particular embodiments, the communication is addressed to second endpoint 68a associated with second end user 66a of private network 36. In response to receiving the externally generated communication, the association information for first end user 62a may be used at step 106 to determine an association between first end user 62a and second end user 66a.

In particular embodiments, an association between first end user 62a and second end user 66a may be identified where the presence information for first end user 62a identifies second end user 66a as a presence watcher of first end user 62a. For example, where presence server 44 maintains a list of presence watchers that are authorized to access presence information for first end user 62a, an association may be identified where second end user 66a is included on the list of presence watchers. In other embodiments, an association between first end user 62a and second end user 66a may be identified where either of the first and second end users have registered to receive or access presence information for the other end user. In still other embodiments, an association may be identified where second end user 66a is included on a white list or other association list that is associated with first end user 62a.

At step 108, the configuration information for first end user 62a is used to configure access point 40 to allow the communication to be delivered to second endpoint 68a. For example, where the configuration information for first end user 62a identifies an access configuration, such as a pinhole, for allowing the communication to pass through access point 40, access point 40 may apply that pinhole to communications received for delivery to second end point 68a. Thus, the configurations associated with first end point 64a may be applied to second endpoint 68a as permitted by presence or other association policy maintained by network system 30. In particular embodiments, access point 40 may open a pinhole in a firewall where first end point 64a is configured to open such a pinhole. As a result of opening the pinhole or otherwise applying the access configuration, the communication may be delivered to second endpoint 68a.

Some of the steps illustrated in FIG. 3 may be combined, modified or deleted where appropriate, and additional steps may also be added to the flowchart. Additionally, steps may be performed in any suitable order without departing from the scope of the invention.

As indicated above, technical advantages of particular embodiments of the present invention include the centralized storage and management of access point configurations for a plurality of network endpoints and their associated users. In particular embodiments, configuration information that includes firewall pinhole definitions for a network end user may be stored in a centralized database. A further technical advantage may be the sharing of the network access configurations between endpoints and end users. Specifically, presence or other association policy may be used to determine whether or not to apply the pinhole configurations adopted by one network end user to other network end users. Where policy permits, communications deemed acceptable by one network end user may be automatically granted access to a private network even where those communications are addressed to other network end users.

Although the present invention has been described in detail with reference to particular embodiments, it should be understood that various other changes, substitutions, and alterations may be made hereto without departing from the spirit and scope of the present invention. For example, although the present invention has been described with reference to a number of elements included within a communication system, these elements may be combined, rearranged or positioned in order to accommodate particular routing architectures or needs. In addition, any of these elements may be provided as separate external components to a communication system or to each other where appropriate. The present invention contemplates great flexibility in the arrangement of these elements as well as their internal components.

Numerous other changes, substitutions, variations, alterations and modifications may be ascertained by those skilled in the art and it is intended that the present invention encompass all such changes, substitutions, variations, alterations and modifications as falling within the spirit and scope of the appended claims.

What is claimed is:

1. A method using shared configuration information to manage network access for externally generated communications, comprising:
   providing an association information store that maintains association information for a first end user of a private network;
   providing a data storage system that maintains configuration information for a first endpoint associated with the first end user;
   receiving an externally generated communication at an access point to the private network, the communication addressed for delivery to a second endpoint associated with a second end user of the private network, the externally generated communication received from a third endpoint associated with a third end user;
   using a computing device to obtain the association information and determine an association between the first end user and the second end user; and
   using the computing device to obtain the configuration information for the first endpoint associated with the first end user and configure the access point to allow the communication from the third endpoint associated with the third end user to be delivered to the second endpoint associated with the second end user based on the association between the first end user and the second end user.

2. The method of claim 1, wherein maintaining the association information for the first end user comprises maintaining presence information relating to the availability of the first end user at the first endpoint.

3. The method of claim 2, further comprising:
storing a list of one or more presence watchers that are authorized to access presence information for the first end user; and
determining that the second end user is listed as a presence watcher of the first end user.

4. The method of claim 2, wherein using the association information to determine the association between the first end user and the second end user comprises determining that the second end user is a subscribed presence watcher of the presence information for the first end user.

5. The method of claim 1, wherein:
maintaining the association information for the first end user comprises storing a list of one or more trusted end users associated with the first end user; and
using the association information to determine the association between the first end user and the second end user comprises determining that the second end user is one of the one or more trusted end users on the list.

6. The method of claim 1, wherein:
maintaining the association information for the first end user comprises:
storing a first list of one or more trusted end users associated with the first end user, a third end user included on the first list as one of the one or more trusted end users; and
storing a second list of one or more trusted end users associated with the third end user;
using the association information to determine the association between the first end user and the second end user comprises:
determining that the third end user is one of the one or more trusted end users on the first list; and
determining that the second end user is one of the one or more trusted end users on the second list.

7. The method of claim 1, wherein using the configuration information for the first end user comprises:
determining that the first endpoint is configured to allow the communication from the third endpoint associated with the third end user to pass through the access point; and
applying the configuration information associated with the first end user to the second endpoint.

8. The method of claim 1, wherein using the configuration information for the first end user comprises opening one or more pinholes in a firewall.

9. The method of claim 1, further comprising taking a vote of a plurality of network end users to determine that the communication is trustworthy.

10. A method using shared configuration information to manage network access for externally generated communications, comprising:
providing an association information store that maintains association information for a first end user and a second end user of a private network;
providing a configuration information server that maintains configuration information for each of a first endpoint associated with the first end user and a second endpoint associated with the second end user;
receiving an externally generated communication at an access point to the private network, the communication addressed for delivery to the second endpoint associated with the second end user of the private network, the externally generated communication received from a third endpoint associated with a third end user;
using a computing device to obtain the association information and determine an association between the first end user and the second end user, the first end user identified in the association information as untrustworthy; and
if the association information identifies the first end user as untrustworthy, use the computing device to:
configure the access point to disallow the communication from the third endpoint associated with the third end user to be delivered to the second endpoint; and
if the association information identifies the first end user as trustworthy, use the computing device to:
determine that the first endpoint associated with the first end user is configured to accept the externally generated communication from the third endpoint associated with the third end user; and
configure the access point to allow the communication from the third endpoint associated with the third end user to be delivered to the second endpoint associated with the second end user based on the association between the first end user and the second end user.

11. A system using shared configuration information to manage network access for externally generated communications, comprising:
an association information store in communication with a private network, the association information store operable to maintain association information for a first end user of the private network;
a configuration server in communication with the private network, the configuration server operable to maintain configuration information for a first endpoint associated with the first end user; and
an access point in communication with the private network, the access point operable to:
receive an externally generated communication, the communication addressed for delivery to a second endpoint associated with a second end user of the private network, the externally generated communication received from a third endpoint associated with a third end user;
use the association information to determine an association between the first end user and the second end user; and
use the configuration information for the first end point associated with the first end user to authorize the communication from the third endpoint associated with the third end user to enter the private network for delivery to the second endpoint associated with the second end user based on the association between the first end user and the second end user.

12. The system of claim 11, wherein the association information store comprises a presence server operable to:
maintain presence information for the first end user of the private network; the presence information relating to the availability of the first end user at the first endpoint.

13. The system of claim 12, wherein the presence server is further operable to:
store a list of one or more presence watchers that are authorized to access presence information for the first end user; and determine that the second end user is listed as a presence watcher of the first end user.

14. The system of claim 12, wherein the access point is further operable to use the presence information to determine that the second end user is a subscribed presence watcher of the presence information for the first end user.

15. The system of claim 11, wherein:
the association information comprises a list of one or more trusted end users associated with the first end user; and
the access point is operable to use the association information to determine the association between the first end user and the second end user by determining that the second end user is one of the one or more trusted end users on the list.

16. The system of claim 11, wherein:
the association information store is further operable to:
store a first list of one or more trusted end users associated with the first end user, a third end user included on the first list as one of the one or more trusted end users; and
store a second list of one or more trusted end users associated with the third end user; and
the access point is further operable to use the association information by:
determining that the third end user is one of the one or more trusted end users on the first list; and
determining that the second end user is one of the one or more trusted end users on the second list.

17. The system of claim 11, wherein the access point is further operable to:
use the configuration information to determine that the first endpoint is configured to allow the communication from the third endpoint associated with the third end user to pass through the access point; and
apply the configuration information associated with the first end user to the second endpoint.

18. The system of claim 11, wherein the access point is further operable to use the configuration information to open one or more pinholes in a firewall.

19. The system of claim 11, wherein the access point is further operable to take a vote of a plurality of network end users to determine that the communication is trustworthy.

20. A system using shared configuration information to manage network access for externally generated communications, comprising:
means for maintaining association information for a first end user of a private network;
means for maintaining configuration information for a first endpoint associated with the first end user;
means for receiving an externally generated communication at an access point to the private network, the communication addressed for delivery to a second endpoint associated with a second end user of the private network, the externally generated communication received from a third endpoint associated with a third end user;
means for using the association information to determine an association between the first end user and the second end user; and
means for using the configuration information for the first endpoint associated with the first end user to configure the access point to allow the communication from the third endpoint associated with the third end user to be delivered to the second endpoint associated with the second end user based on the association between the first end user and the second end user.

21. A non-transitory computer readable medium comprising code operable to: A non-transitory computer-readable medium encoded with software for using shared configuration information to manage network access for externally generated communications, the software executed by a computer to perform operations comprising:
maintain association information for each of a first end user and a second end user of a private network;
maintain configuration information for each of a first endpoint associated with the first end user and a second endpoint associated with the second end user;
receive an externally generated communication at an access point to the private network, the communication addressed for delivery to the second endpoint associated with the second end user of the private network, the externally generated communication received from a third endpoint associated with a third end user;
use the association information to determine an association between the first end user and the second end user; and
if the association information identifies the first end user as untrustworthy:
use the configuration information for the first end user to configure the access point to allow the communication from the third endpoint associated with the third end user to be delivered to the second endpoint; and
if the association information identifies the first end user as trustworthy:
determine that the first endpoint associated with the first end user configured to accept the externally generated communication from the third endpoint associated with the third end user; and
configure the access point to allow the communication from de source other than the first endpoint to be delivered to the second endpoint associated with the second end user based on the association between the first end user and the second end user.

22. The method of claim 1, further comprising using the computing device to determine that the configuration information for the first endpoint associated with the first end user allows communication from the third endpoint associated with the third end user.

23. The method of claim 1, further comprising:
store a first list of one or more trusted end users associated with the first end user; and
determine that the third end user is included on the first list as one of the one or more trusted end users.

24. The system of claim 11 wherein the access point is further operable to determine that the configuration information for the first endpoint associated with the first end user allows communication from the third endpoint associated with the third end user.

25. The system of claim 11, wherein:
at least one of the association information store and the configuration server is further operable to maintain a first list of one or more trusted end users associated with the first end user; and
the access point is further operable to determine that the third end user is included on the first list as one of the one or more trusted end users.

26. A non-transitory computer-readable medium encoded with software for using shared configuration information to manage network access for externally generated communications, the software executed by a computer to perform operations comprising:
maintain association information for a first end user of a private network;
maintain configuration information for a first endpoint associated with the first end user;

receive an externally generated communication at an access point to the private network, the communication addressed for delivery to a second endpoint associated with a second end user of the private network, the externally generated communication received from a third endpoint associated with a third end user;

obtain the association information and determine an association between the first end user and the second end user; and obtain the configuration information for the first endpoint associated with the first end user and configure the access point to allow the communication from the third endpoint associated with the third end user to be delivered to the second endpoint associated with the second end user based on the association between the first end user and the second end user.

27. The non-transitory computer-readable medium of claim 26, further operable when execute to:
    determine that the configuration information for the first endpoint associated with the first end user allows communication from the third endpoint associated with the third end user.

28. The non-transitory computer-readable medium of claim 26, further operable when executed to:
    store a first list of one or more trusted end users associated with the first end user; and
    determine that the third end user is included on the first list as one of the one or more trusted end users.

* * * * *

UNITED STATES PATENT AND TRADEMARK OFFICE
CERTIFICATE OF CORRECTION

PATENT NO. : 7,764,699 B2  Page 1 of 1
APPLICATION NO. : 11/130439
DATED : July 27, 2010
INVENTOR(S) : Cullen F. Jennings et al.

It is certified that error appears in the above-identified patent and that said Letters Patent is hereby corrected as shown below:

On the cover page, add reference item [56] Col. 2: "6,758,543, 6/2004, Vilhuber, 713/201";

Col. 17, Ln. 66: After "21." delete "A non-transitory computer readable medium comprising code operable to:".

Signed and Sealed this

Twelfth Day of October, 2010

David J. Kappos
*Director of the United States Patent and Trademark Office*